UNITED STATES PATENT OFFICE 2,176,843

PROCESS OF PREPARING IMIDAZOLINES

Georg Kränzlein and Herbert Bestian, Frankfort-on-the-Main, and Walther Schnurr, Bad Soden in Taunus, Germany, assignors to I. G. Farbenindustrie Aktiengesellschaft, Frankfort-on-the-Main, Germany No Drawing. Application March 15, 1938, Serial No. 195,978. In Germany March 18, 1937

9 Claims. (Cl. 260—309)

In German Specification No. 78,020 (Friedländer, vol. IV, page 1206) and in Berichte der Deutschen Chemischen Gesellschaft, vol. 27, page 2952 and vol. 28, pages 1173 and 1175 there is described the manufacture of the methyl, ethyl and propyl imidazolines by dry distillation of ethylene-diamine hydrochloride with the sodium salt of the acetic, propionic and butyric acid respectively.

By this reaction a considerable quantity of N.N'-diacylethylenediamine is formed as a by-product and the yield of imidazolines is therefor only moderate. In order to obtain the product in a pure state the imidazolines thus obtained must be subjected to various rather complicated purifying operations.

Now we have found, that imidazolines may be made in a new and simple manner by heating the urea of ethylene diamine or a derivative thereof with a mono-carboxylic acid at an elevated temperature, advantageously at a temperature above 200° C. The imidazolines formed may be distilled, if desired under reduced pressure. The reaction occurs with elimination of water and carbon dioxide according to the following equation:

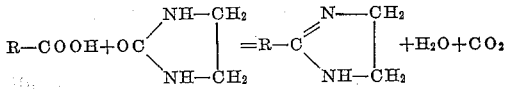

Imidazolines are directly formed in a very pure form and with a good yield.

The products obtainable according to the present invention are intended to be used as parent materials for textile adjuvants, softening agents and the like.

The following examples serve to illustrate the invention, but they are not intended to limit it thereto; the parts are by weight:

(1) 39 parts of N.N'-ethylene-urea are heated to 250° C.–260° C. in a flask provided with a stirrer and a lateral discharge tube. 85.2 parts of commercial oleic acid are then run in at constant temperature, in the course of 6 hours, in such a way, that the speed of running in diminishes with the lapse of time. The formation of imidazoline accompanied by elimination of carbon dioxide and water is terminated by further heating the whole, for 18 hours, at 280° C–300° C. The mass is then subjected to distillation under very reduced pressure.

After a few first runnings, the heptadecenyl-imidazoline formed distils with a yield of about 85 percent, of the theoretical at 228° C. under a pressure of 3 mm., in the form of a nearly colorless liquid which, on cooling, slowly crystallizes. By recrystallizing it from acetone, the heptadecenyl-imidazoline is obtained in the form of a snow-white flaky product which melts at about 55° C. By extracting the first runnings of the distillation with boiling water, a further quantity of pure heptadecenylimidazoline may be obtained.

(2) 39 parts of N.N'-ethylene-urea are heated to 230° C.–240° C., as indicated in Example 1. At a constant temperature there are then introduced within 6 hours 85.4 parts of commercial stearic acid in portions which become smaller with the lapse of time. The formation of imidazoline which thereby begins, while carbon dioxide and water are eliminated, is terminated by further heating at 280° C.–300° C., for 18 hours. The mass is then subjected to distillation under very reduced pressure. After a few first runnings, the heptadecyl-imidazoline formed distils with a good yield, at 230° C. and under a pressure of 3 mm., in the form of a nearly colorless liquid, which, on cooling, immediately solidifies to a crystalline body. By recrystallization from acetone, the heptadecyl-imidazoline is obtained in the form of a snow-white, flaky product which melts at 86° C.–87° C. By extracting the first runnings of the distillation with boiling water, a further quantity of pure heptadecyl-imidazoline may be obtained.

(3) 39 parts of N.N'-ethylene-urea are heated to 240–250° C. in a flask provided with a stirrer and a lateral discharge tube. In the course of 6 hours, these are then introduced, at constant temperature, 78.6 parts of palmitic acid in small portions. The formation of imidazoline begins, carbon dioxide and water being eliminated, and is completed by further heating, after the introduction of the palmitic acid, for 18 hours at 280° C.–300° C. The mass is then distilled under very reduced pressure. After a few runnings, the pentadecyl-imidazoline distils with a good yield, at 220° C. and under a pressure of 3 mm., in the form of a nearly colorless liquid which, on cooling, quickly solidifies to a crystalline body. By recrystallizing it from acetone, the pentadecyl-imidazoline is obtained in the form of a snow-white flaky compound which melts between 82° C.–84° C. By extracting the first runnings of the distillation with boiling water there may be obtained a further quantity of pure pentadecyl-imidazoline.

(4) 122 parts of benzoic acid are quickly heated to 210° C. together with 100 parts of ethylene-urea, in a flask provided at its upper side wall with a discharge tube. At this temperature the formation of imidazoline begins, carbon dioxide and water being eliminated. The temperature is then gradually raised, within 2 hours, to 280° C. After further heating for 24 hours, at 280° C.–300° C., the contents of the flask are distilled under reduced pressure. The phenyl-imidazoline formed distils with a good yield, at 188° C. and under a pressure of 20 mm., in the form of a nearly colorless liquid which, on cooling, immediately solidifies to long needles. By dissolving the product in ethyl acetate and recrystallizing it, the phenylimidazoline is obtained in the form of colorless crystals melting at 100° C.–102° C. (According to K. W. Hofmann, Berichte der Deutschen Chemischen Gesellschaft, vol. 25, page 2334, and according to Frossel, vol. 25, page 2135, the melting point is situated at 101° C.).

(5) 88 parts of butyric acid are gradually heated to 240° C.–250° C., together with 100 parts of ethylene-urea. The water formed during the reaction is allowed to escape through a condenser. After heating for 40 hours at 240° C.–250° C., the contents of the flask which have a feebly yellow coloration, are distilled under reduced pressure. The propylimidazoline formed distils with a good yield at 116° C. and under a pressure of 16 mm., in the form of an oil, clear as water, which, on cooling, crystallizes in long hygroscopic needles. The propylimidazoline is very easily soluble in the usual organic solvents as well as in water. Its aqueous solution shows a strongly alkaline reaction. By further heating to 240° C.–250° C. there may be obtained, from the residue of the distillation, a further quantity of propyl-imidazoline.

(6) 50 parts of N.N'-ethylene-urea and 86 parts of alpha-naphtoic acid are slowly heated to 280° C.–300° C. The water formed in the course of the reaction is distilled through a lateral discharge tube. After having been heated at 280° C.–300° C. for a long time, the contents of the flask are subjected to a distillation under reduced pressure. The alpha-naphthyl-2-imidazoline distils with a good yield between 210° C. and 250° C., at a pressure of 18 mm., as an almost colorless oil, which, on cooling, crystallizes quickly. By extracting with boiling water and redissolving in ethyl acetate, long needles are obtained which melt at 136° C.

(7) 50 parts of N.N'-ethylene-urea and 86 parts of β-naphtoic acid are slowly heated to 280° C.–300° C. The water formed by the reaction is distilled through a lateral discharge tube. After having been heated at 280° C.–300° C. for a long time, the contents of the flask are subjected to distillation under reduced pressure. The β-naphthyl-2-imidazoline distils with a good yield as a tough, slightly yellow oil, which crystallizes on cooling. By recrystallizing from ethyl acetate, long needles are obtained, having a melting point of 124°. The compound is but little soluble in water. Its aqueous solution shows a strongly alkaline reaction.

(8) 238 parts of a carboxylic acid obtained by the oxidation of paraffine (average molecular weight 238, saponification number 235.9, acid number 219.6) and 130 parts of ethylene-urea are heated at 280° C.–300° C., for 24 hours, in the same way as described in Example 1. The mass, solidifying on cooling, is then subjected to distillation under strongly reduced pressure. The imidazoline formed by the reaction distils between 180° C. and 280° C., under a pressure of 0.8 mm., as a slightly yellow oil which solidifies to crystals on cooling. The yield amounts to about 60 per cent of the theoretical. The product dissolves in dilute acid to a clear solution and is precipitated from the acid solution by addition of an alkali.

(9) 520 parts of ethylene-urea are melted in the apparatus, described in Example 1. 792 parts of diphenyl-4-carboxylic acid are introduced into the melt, while it is heated to 180° C.–200° C. After having terminated the introduction of the carboxylic acid, the temperature is gradually raised. At a temperature of 230° C. elimination of water and carbon dioxide begins with strong foaming. As soon as the foaming subsides, the temperature is raised to 315° C.–320° C. After heating the product at this temperature for 5 hours, the contents of the flask are poured on an iron plate. The mass, which solidifies on cooling, is pulverized and extracted by boiling with a sufficient quantity of dilute acetic acid. Its solution is filtered with suction from the insoluble residue. By addition of caustic soda solution to the filtrate the 4'-diphenyl-2-imidazoline is obtained as a white flaky compound with a yield of 60–70%. The 4'-diphenylyl-2-imidazoline can be distilled under atmospheric pressure without decomposition. Under a pressure of 11 mm. the product distils at 280° C. as an almost colorless liquid which rapidly solidifies on cooling. When crystallized from chlorobenzene it forms irregular tablets which sharply melt at 197° C. The 4'-diphenylyl-2-imidazoline is very easily soluble in dilute acetic acid. By adding hydrochloric acid, dilute sulfuric acid or dilute nitric acid the corresponding mineral acid salts of the 4'-diphenylyl-2-imidazoline precipitate as well crystallized compounds; the hydrochloride forms long needles.

(10) 130 parts of ethylene-urea are melted in the apparatus described in Example 1. 211.1 parts of carbazol-2-carboxylic acid (prepared from 2-chloroacetyl-N-acetyl-carbazol by melting with caustic potash) are introduced into the melt heated to 180° C.–200° C. After having introduced the carboxylic acid, the temperature is gradually raised to 280° C.–300° C. With elimination of water and carbon dioxide the ring formation of the imidazoline begins, which is terminated by heating to 280° C.–300° C., for 24 hours. For the purpose of working up the product, the contents of the flask are pulverized and extracted by boiling with a sufficient quantity of dilute acetic acid. The whole is filtered with suction from the insoluble residue; caustic soda solution is added to the filtrate and the 2'-carbazolyl-2-imidazoline is obtained with a good yield as a flaky compound. The compound can be crystallized from a large quantity of chlorobenzene. It forms rhomboidal crystals which melt with decomposition between 255° C. and 256° C. The compound is easily soluble in dilute acetic acid. On addition of hydrochloric acid to the solution the hydrochloride crystallizes in form of short needles, which decompose at 275° C., while darkening.

(11) 12 parts of N.N'-propylene-urea and 12.2 parts of benzoic acid are heated for 6 hours at 300° in an apparatus consisting of glass with ground joints and provided with a refrigerating pipe. The methyl-2-phenyl-imidazoline formed may advantageously be isolated from the reaction product by distillation under reduced pressure. It distils at a pressure of 3 mm., between 150° C. and 175° C., as a colorless liquid, which is soluble in a dilute acid to a clear solution. From its aqueous solution the compound is again precipitated by means of strong alkalies. The distilled methyl-2-phenyl-imidazoline shows little tendency to crystallize, as it is obtained in the form of a mixture of 2 isomers which have been formed by the reaction of N.N'-propylene-urea with benzoic acid:

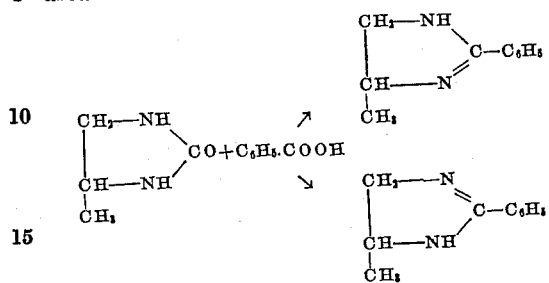

We claim:

1. The process of preparing 2-substituted imidazolines which comprises reacting a compound selected from the group consisting of N.N'-ethylene-urea and N.N'-ethylene-urea, wherein at least one hydrogen atom of the methylene groups is replaced by a hydrocarbon radical with mono-carboxylic acids other than formic acid.

2. The process of preparing 2-substituted imidazolines which comprises reacting a compound selected from the group consisting of N.N'-ethylene-urea and N.N'-ethylene-urea, wherein at least one hydrogen atom of the methylene groups is replaced by a hydrocarbon radical with aliphatic monocarboxylic acids other than formic acid.

3. The process of preparing 2-substituted imidazolines which comprises reacting a compound selected from the group consisting of N.N'-ethylene-urea and N.N'-ethylene-urea, wherein at least one hydrogen atom of the methylene groups is replaced by a hydrocarbon radical with aromatic monocarboxylic acids.

4. The process of preparing 2-substituted imidazolines which comprises heating to a high temperature a compound selected from the group consisting of N.N'-ethylene-urea and N.N'-ethylene-urea, wherein at least one hydrogen atom of the methylene groups is replaced by a hydrocarbon radical with mono-carboxylic acids other than formic acid.

5. The process of preparing 2-substituted imidazolines which comprises heating to temperatures lying between 200 and 300° C. a compound selected from the group consisting of N.N'-ethylene-urea and N.N'-ethylene-urea, wherein at least one hydrogen atom of the methylene groups is replaced by a hydrocarbon radical with mono-carboxylic acids other than formic acid.

6. The process of preparing 2-alkyl substituted imidazolines which comprises heating to a high temperature N.N'-ethylene-urea with aliphatic monocarboxylic acids other than formic acid.

7. The process of preparing 2-heptadecylimidazoline which comprises heating to a high temperature N.N'-ethylene-urea with stearic acid.

8. The process of preparing 2-heptadecenyl-imidazoline which comprises heating to a high temperature N.N'-ethylene-urea with oleic acid.

9. The process of preparing 2-pentadecyl-imidazoline which comprises heating to a high temperature N.N'-ethylene-urea with palmitic acid.

GEORG KRÄNZLEIN.
HERBERT BESTIAN.
WALTHER SCHNURR.